United States Patent
She et al.

(10) Patent No.: US 7,433,303 B2
(45) Date of Patent: Oct. 7, 2008

(54) PREEMPTIVE NETWORK TRAFFIC CONTROL FOR REGIONAL AND WIDE AREA NETWORKS

(75) Inventors: Alfred C. She, Beaverton, OR (US); Samuel J. Peters, II, Beaverton, OR (US); I. Claude Denton, Beaverton, OR (US)

(73) Assignee: Null Networks LLC, Las Vegas, NV (US)

( * ) Notice: Subject to any disclaimer, the term of this patent is extended or adjusted under 35 U.S.C. 154(b) by 1104 days.

(21) Appl. No.: 10/211,174

(22) Filed: Aug. 2, 2002

(65) Prior Publication Data

US 2004/0022187 A1 Feb. 5, 2004

(51) Int. Cl.
*H04L 12/26* (2006.01)
*H04L 12/28* (2006.01)

(52) U.S. Cl. .................. 370/229; 370/235; 370/412

(58) Field of Classification Search ............... None
See application file for complete search history.

(56) References Cited

U.S. PATENT DOCUMENTS

| | | | |
|---|---|---|---|
| 5,243,596 A * | 9/1993 | Port et al. | 370/231 |
| 6,170,022 B1 * | 1/2001 | Linville et al. | 370/231 |
| 6,222,825 B1 * | 4/2001 | Mangin et al. | 370/235 |
| 7,046,624 B1 * | 5/2006 | Iwatsuki et al. | 370/229 |
| 2003/0218977 A1 * | 11/2003 | Pan et al. | 370/230 |

* cited by examiner

*Primary Examiner*—Steven H. D Nguyen
(74) *Attorney, Agent, or Firm*—Schwabe, Williamson & Wyatt P.C.

(57) ABSTRACT

In a network apparatus, control logic is provided to preemptively issue pause controls to a sender of network traffic of a link to preemptively regulate a rate the sender may send network traffic of the link. In one embodiment, the pause controls are sent periodically, with each including a pause duration. In one embodiment, at least a selected one of the pause duration and the periodicity of preemptive issuance is determined based at least in part on at least a selected one of a working capacity of storage medium allocated to service the link, a network traffic drain rate of the link, and a fill rate of the input line over which the network traffic of the link is received. In one embodiment, the networking apparatus is an optical networking module with the control logic disposed in a multi-protocol networking processor of the module.

24 Claims, 5 Drawing Sheets

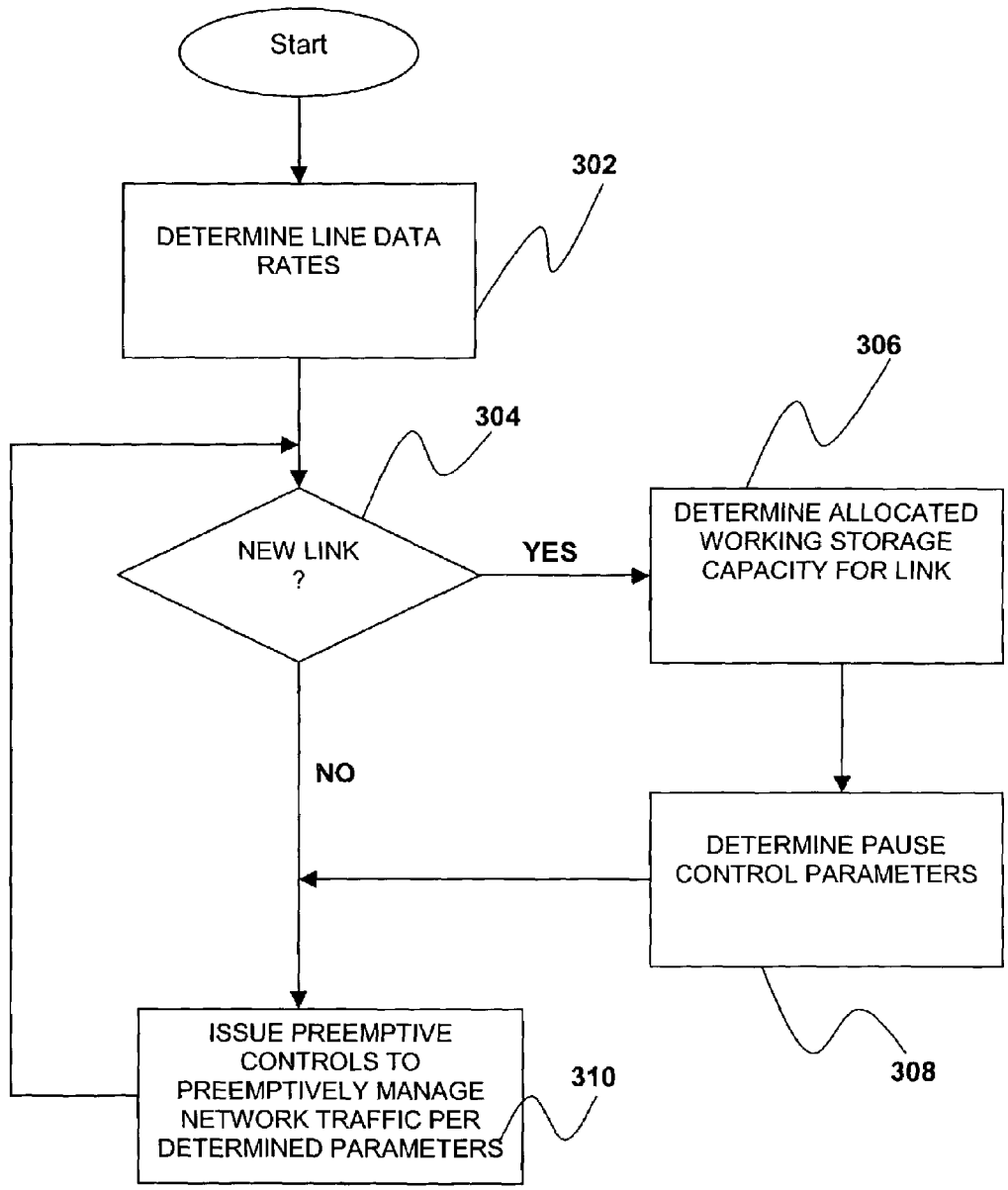

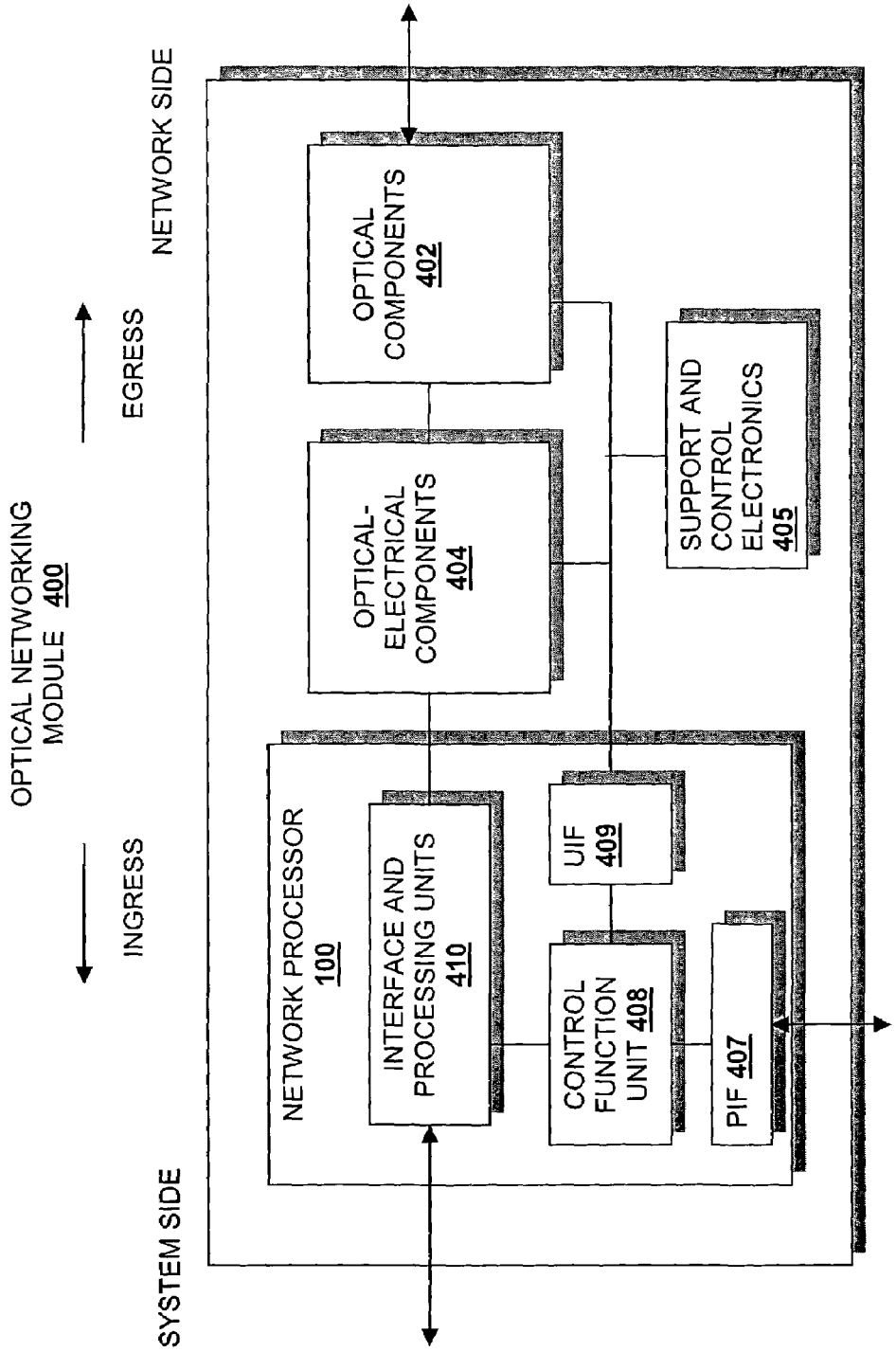

US 7,433,303 B2

PREEMPTIVE NETWORK TRAFFIC CONTROL FOR REGIONAL AND WIDE AREA NETWORKS

FIELD OF THE INVENTION

The present invention relates to the field of networking. More specifically, the present invention relates to network traffic control for high speed networking, such as, 10 Gigabit Ethernet spanning local, regional, and wide area networks.

BACKGROUND OF THE INVENTION

With advances in integrated circuit, microprocessor, networking and communication technologies, an increasing number of devices, in particular, digital computing devices, are being networked together. Devices are often first coupled to a local area network, such as an Ethernet based office/home network. In turn, the local area networks are interconnected together through wide area networks, such as SONET networks, ATM networks, Frame Relays, and the like. Of particular importance is the TCP/IP based global inter-network, the Internet. Historically, data communication protocols specified the requirements of local/regional area networks, whereas telecommunication protocols specified the requirements of the regional/wide area networks. The rapid growth of the Internet has fueled a convergence of data communication (datacom) and telecommunication (telecom) protocols and requirements. It is increasingly important that data traffic be carried efficiently across local, regional, as well as wide area networks.

As a result of this trend of increased connectivity, an increasing number of applications that are network dependent are being deployed. Examples of these network dependent applications include but are not limited to, the world wide web, email, Internet based telephony, and various types of e-commerce and enterprise applications. The success of many content/service providers as well as commerce sites depend on high-speed delivery of a large volume of data across wide areas. As a result, high-speed data trafficking devices, such as high-speed optical, or optical-electro routers, switches and so forth, are needed.

Unfortunately, because of the high-speed delivery of large volume of data across the network, a device on the network may not be able to timely process all received data. That is, a device on the network may be not able to process the received data at the rate at which the data is received. In order to improve the likelihood of timely processing all received data, one or more buffers are commonly utilized to temporarily hold the received data while the received data is waiting to be processed by the device. However, buffers are typically sized for certain "normal" or expected network traffic patterns, and the actual network traffic often deviates from the expectation unpredictably, resulting in the buffers becoming full or overflow. Once the buffer becomes full or overflow condition occurs, subsequent data may be lost, requiring the data to be resent.

Additionally, multiple data links may be sharing a physical line, and it may be desirable to regulate and prevent one or more data links from consuming more bandwidth than the data links are supposed/entitled to use.

Transmission control in the form of a pause command (transmitted from an "overflowing" receiver to a sender) may be utilized between the communicating devices. However, while responsive utilization of the pause command may be effective for LAN, experience has shown that the technique may not be effective with high speed regional/wide area networks. The reason being, by the time the pause command responsive issued by the overflowing receiver is received by the sender, large volume of data may already be in transit from the sender to the receiver.

Accordingly, a need exists for facilitating improved network traffic control for high speed network traffic, in particular, for high speed regional/wide area networks, such as 10 gb Ethernet (10GBASE-LR or 10GBASE-LW).

BRIEF DESCRIPTION OF DRAWINGS

The present invention will be described by way of exemplary embodiments, but not limitations, illustrated in the accompanying drawings in which like references denote similar elements, and in which:

FIGS. 3A-3B illustrate the operational flow of the relevant aspects of preemptive pause control logic of FIG. 1 in further detail, in accordance with one embodiment; and FIG. 4 illustrates an exemplary application of the network processor of FIG. 1.

GLOSSARY

| | |
|---|---|
| 10GBASE-LR | 64/66 coded 1310 nm LAN standard for 10 Gigabit Ethernet |
| 10GBASE-LW | 64/66 coded SONET encapsulated 1310 nm WAN standard for 10 Gigabit Ethernet |
| ASIC | Application Specific Integrated Circuit |
| DDRAM | Dynamic Direct Random Access Memory |
| Egress | Outgoing data path from the system to the network |
| EEPROM | Electrical Erasable Programmable Read-Only-Memory |
| Ingress | Incoming data path from the network to the system |
| LAN | Local Area Network |
| LVDS | Low voltage differential signal |
| MAC | Media Access Control layer, defined for Ethernet systems |
| OIF | Optical Internetworking Forum |
| SONET | Synchronous Optical NETwork, a PHY telecommunication protocol |
| SDRAM | Static Direct Random Access Memory |
| SPI-4 | System Packet Interface Level 4(also POS-PHY 4) |
| WAN | Wide Area Network |

DETAILED DESCRIPTION OF THE INVENTION

In the following description, various aspects of the present invention will be described. However, it will apparent to those skilled in the art that the present invention may be practiced with only some or all aspects of the present invention. For purposes of explanation, specific numbers, materials and configurations are set forth in order to provide a thorough understanding of the present invention. However, it will be also apparent to one skilled in the art that the present invention may be practiced without the specific details. In other instances, well-known features are omitted or simplified in order not to obscure the present invention.

References herein to "one embodiment", "an embodiment", or similar formulations, means that a particular feature, structure, or characteristic described in connection with the embodiment, is included in at least one embodiment of the present invention. Thus, the appearances, of such phrases or formulations herein are not necessarily all referring to the same embodiment. Furthermore, various particular feature, structures, or characteristics may be combined in any suitable manner in one or more embodiments.

Embodiments of the present invention provide efficient methods and apparatus for controlling data flow between networked devices, in particular, networked devices in high speed regional/wide area networks.

Figure 1:
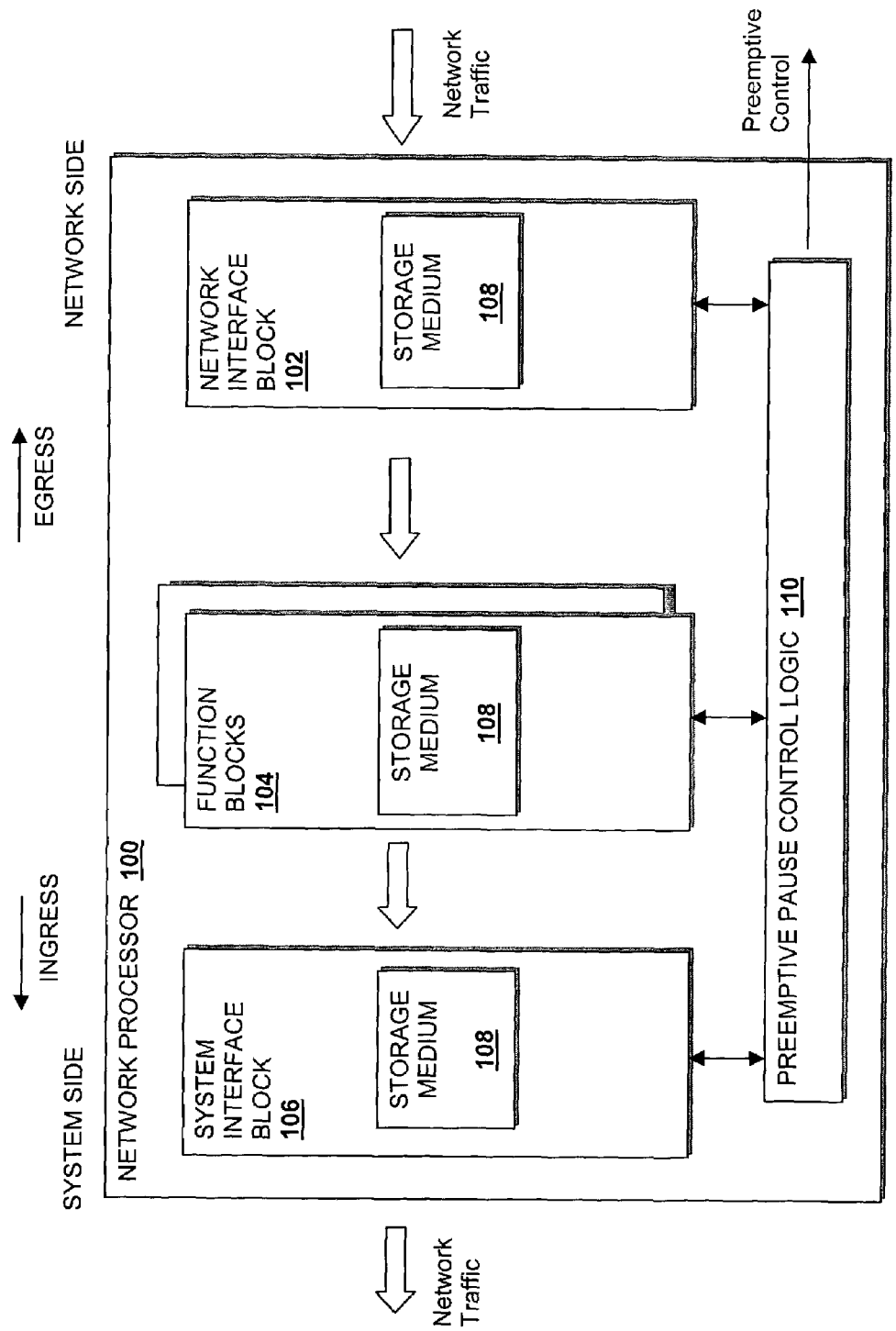
FIG. 1 illustrates an overview of the present invention, in the context of a network processor, in accordance with one embodiment.

FIG. 1 illustrates an overview of the present invention, in the context of an exemplary network processor, in accordance with one embodiment. Exemplary network processor 100 may e.g. be a component of a high speed networking module or device coupled to a high speed network, receiving and processing network traffic from one or more sender network nodes remotely disposed across a regional/wide area network over corresponding data links.

As illustrated in FIG. 1, for the embodiment, exemplary network processor 100 includes a first interface block 102 for interfacing with a network (not shown) to receive network traffic data of the various data links, and a number of function blocks 104 for processing the received network traffic data of the various data links. Exemplary network processor 100 further includes a second interface block 106 for interfacing with a system (not shown) to forward to the system, the processed network traffic data of the various data links.

For the illustrated embodiment, the first interface block 102, function blocks 104, and the second interface 106, each includes a certain amount of storage medium 108 to be allocated in portions or in whole to temporarily stage the ingress network traffic data, as they are received, and moved through network processor 100 onto the coupled system.

Additionally, as shown in FIG. 1, in accordance with the present invention, network processor 100 is advantageously provided with preemptive pause control logic 110. Preemptive pause control logic 110 is equipped to preemptively send pause controls to senders of the ingress network traffic of the one or more links to preemptively regulate them on the rates they can transmit network traffic for the respective data links. That is, under the present invention, preemptive pause control logic 110 preemptively sends pause controls to senders of the data links to preemptively regulate them before some or all of the senders of the links fully use up or exceed their bandwidths. The preemptive regulation advantageously overcomes the inherent latency in delivering these pause controls to the senders of the various data links, in the prior art reactive approach to regulating network traffic, especially in a regional/wide area networking application.

Before proceeding to further describe the present invention, it should be noted while the remaining descriptions are presented primarily in the context of preemptively regulating the ingress network traffic, the present invention may also be practiced to regulate the egress network traffic. Application of the present invention to regulate egress network traffic based on the ingress centric description is well within the ability of those skilled in the art, accordingly the present invention will not be redundantly re-described for egress network traffic.

Continuing to refer to FIG. 1, in various embodiments, preemptive pause control logic 110 issues or causes the pause controls to be issued periodically for the various data links. Moreover, preemptive pause control logic 110 issues or causes each of the pause controls to be issued with a pause duration the sender of network traffic of a data link is to pause and refrain from sending network traffic for the data link.

In various embodiments, preemptive pause control logic 110 is equipped to determine the pause durations included in the pause controls, as well as the periodicity for issuing the pause controls.

In various embodiments, preemptive pause control logic 110 is equipped to determine at least one of the pause duration and the periodicity for issuing pause controls for a data link, based at least in part on at least one of the working storage capacities allocated to service the data link, a network traffic drain rate of the data link, and a fill rate of an input line over which the network traffic of the data link is received, to be described more fully below.

The network processor 100 shown in FIG. 1 may be any one of a wide range of high speed network processors known in the art, including but not limited to the multi-protocol processor of U.S. patent application Ser. No. 09/860,207, filed on May 18, 2001, entitled "A Multi-Protocol Networking Processor With Data Traffic Support Spanning Local, Regional, and Wide Area Networks", and having at least partial common inventorship with the present application, which specification is hereby fully incorporated by reference.

Function blocks 104 may be any one of a number of function blocks of a network processor or networking device, e.g., a MAC block of a network processor. For ease of understanding, only a couple of function blocks are shown in FIG. 1. However, in practice, network processor 100 or other context on which the present invention is incorporated, may include one or more function blocks.

Each of interfaces 102 and 106 may be any one of a number of system and network interfaces known in the art, including, but not limited to, a parallel LVDS interface compliant with OIF's SFI-4 interface for 102, and a parallel LVDS interface compliant with OFI's SPI-4 interface for 106.

Storage medium 108 may be any storage medium known in the art, including but not limited to SDRAM, DDRAM, EEPROM, Flash memory and so forth. For the embodiment, one storage medium is shown to be disposed in each of function blocks 104 and interfaces 102, however, in practice, each of the selected ones of the components of the contextual networking device on which the present invention is practiced, may have one or more storage medium, with all or a portion to be allocated to service a data link. Together, the total capacity of the allocated portions of storage mediums 108 are collectively referred to as the working capacity allocated for staging the data of a particular link.

Figure 2:
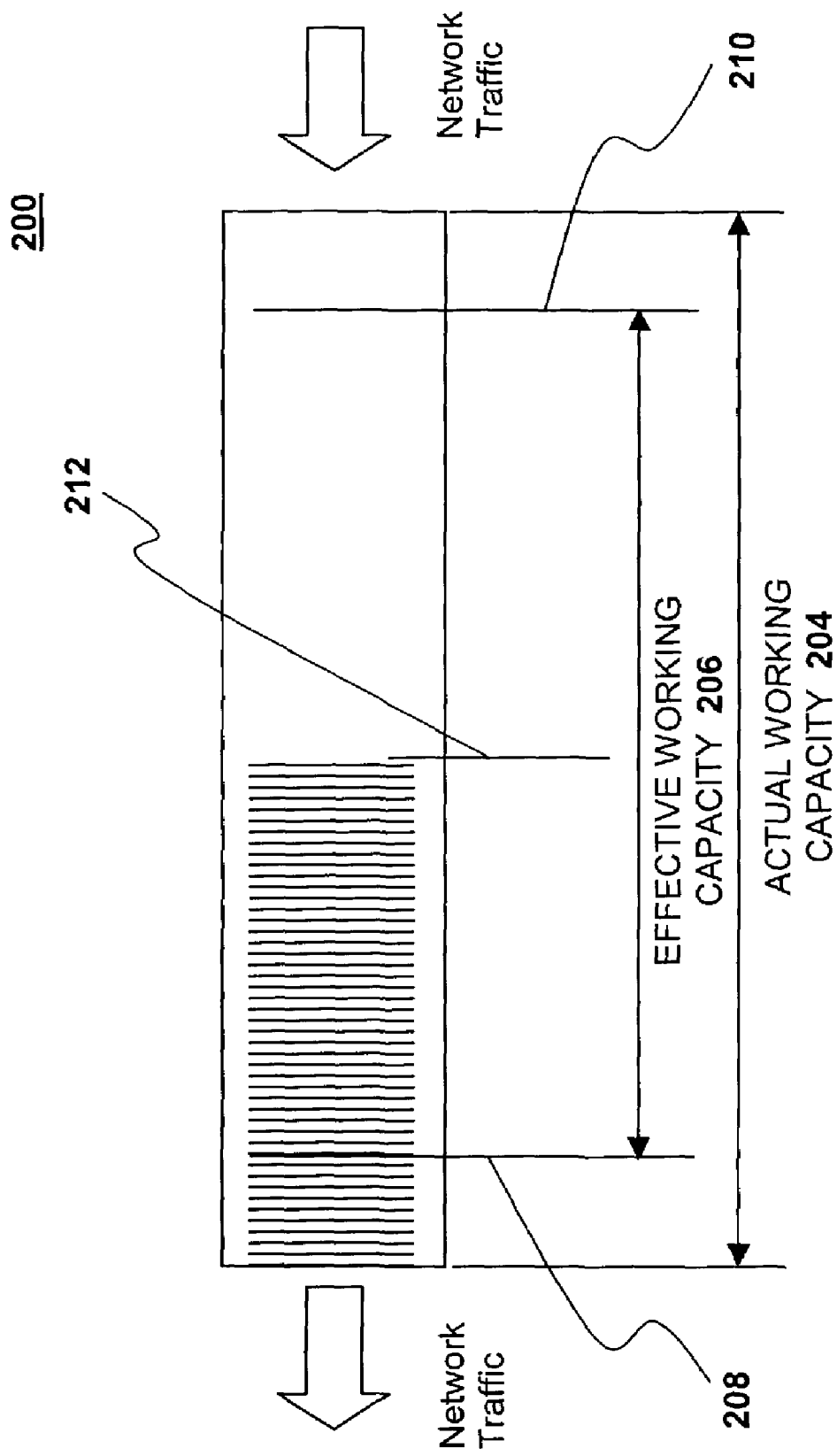
FIG. 2 illustrates the concept of working storage capacity in further details, in accordance with one embodiment.

FIG. 2 illustrates the notion of working capacity in further detail. Illustrated in FIG. 2 is a logical view of the total storage medium 200 of the various components of the contextual networking device on which the present invention is practiced, allocated to service a data link.

As illustrated, network traffic of the data link is received, buffered, processed and forwarded onto a coupled system or another networking device, using the allocation storage medium 200.

For the purpose of the present application, the total amount of the allocated storage medium is referred to as the actual working capacity 204 of the allocated storage medium, whereas the portion of the actual working capacity between a low and a high "watermark" 208 and 210 is referred to as the effective working capacity 206.

As will be described in more detail below, for the embodiments where the pause durations and the periodicity for issuing the pause controls are determined based at least in part on the working capacity of the allocated storage medium, the present invention may be practiced using either actual working capacity 204 or effective working capacity 206.

Employment of working capacity 206 provides for an even more aggressive approach to preemptively regulate the network traffic of the various data links, further reducing the likelihood of the allocated storage medium being overflowed, and necessitating the retransmission of the lost data. However, the reduction in the likelihood of overflow may be gained at the expense of reduced efficiency in fully utilizing the allocated storage medium.

For the embodiments where the present invention is practiced employing the effective working capacity, preferably, the low and high watermarks 208 and 210 are configurable. Such configuration may be achieved via any one of a number of configuration techniques known in the art.

Figure 3B:
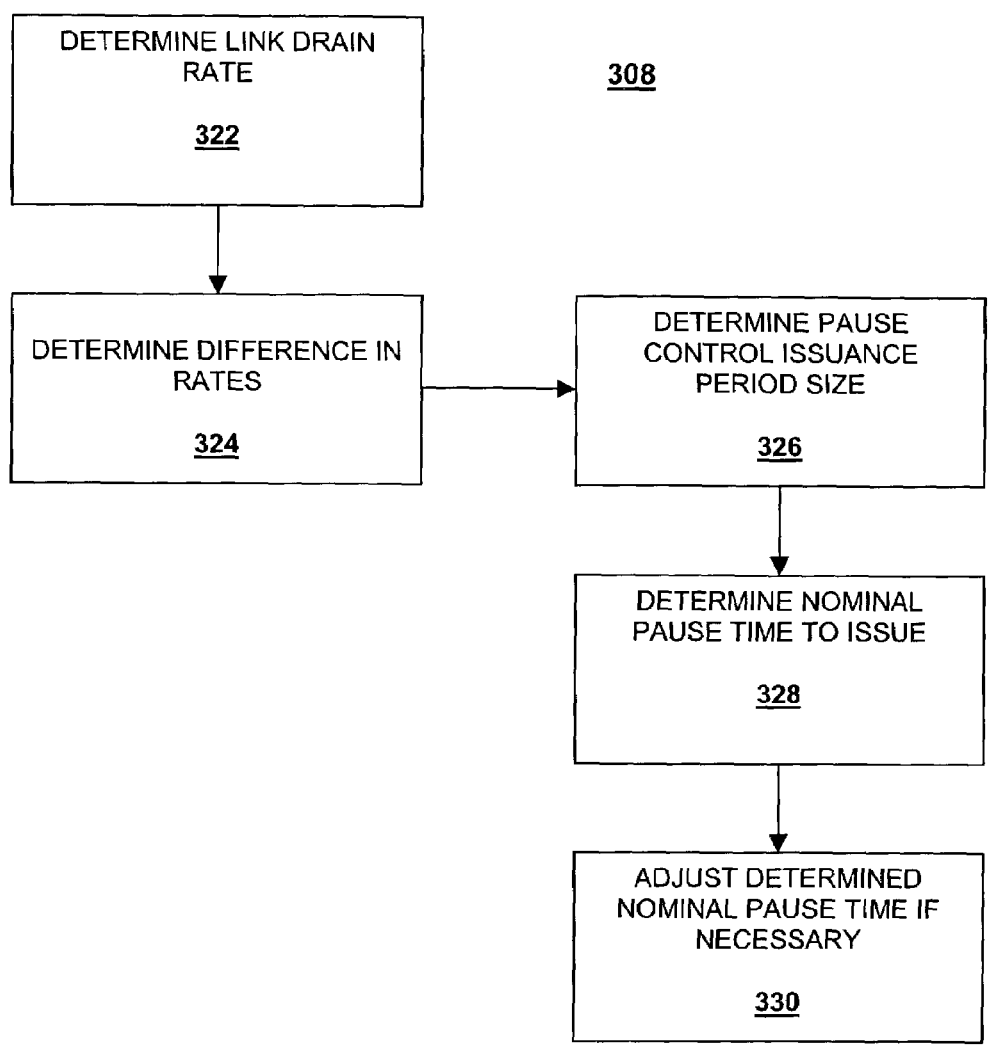

FIGS. 3A-3B illustrate the operational flow of the relevant aspects of the preemptive pause control logic 110 of FIG. 1, in accordance with one embodiment. As will be appreciated by those skilled in the art, based on the description to follow, in practice, preemptive pause control logic 110 may be realized in hardware, e.g. through ASIC, or in software, executed e.g. by an embedded controller.

As illustrated in FIG. 3A, on initialization, e.g. at power on or reset, preemptive pause control logic 110 first determines the fill rate of an input line over which network traffic of various data links will be received, block 302. In various embodiments, the fill rate is corresponding to the rate the input line is clocked. In various embodiments, the clocking rate is networking protocol based. Accordingly, for at least some of these embodiments, preemptive pause control logic determines the fill rate of the input line by determining the networking protocol network processor 100 is configured to operate.

Thereafter, preemptive pause control logic 110 waits for the establishment of the data links, block 304. As those skilled in the art would appreciate, establishment of the data links may be triggered by the senders of the network traffic or by the recipients requesting data from the senders.

For the illustrated embodiment, upon detecting the establishment of a data link, preemptive pause control logic 110 determines the working capacity of the total storage medium of the various components allocated to service the data link, i.e. to buffer, process and forward the received network traffic.

In various embodiments, allocation of the storage medium by the various components to service a data link, involves the establishment of address ranges, and pointers pointing to the start and/or end of the allocated portions of the storage medium. For these embodiments, preemptive pause control logic 110 determines the working capacity based on these address ranges and/or pointers. In alternate embodiments, other approaches may be practiced instead.

In various embodiments, the amount of storage medium allocated to service a data link is protocol dependent, e.g. in the case of 10 Gb Ethernet applications, the amount of storage medium allocated to service a data link in one embodiment is about 12,288 bytes. For these embodiments, preemptive pause control logic 110 may similarly determine the working storage capacity by accessing the configuration storage (not shown) to determine the networking protocol network processor 100 is configured to operate.

For embodiments where the effective working capacity (as opposed to the actual working capacity) is used, preemptive pause control logic 110 further determines the low and high "watermarks" to determine the "safety margin" to be applied to the actual working capacity. As described earlier, in various embodiments, the "watermarks" are preferably configurable, and accordingly are retrieved from the configuration storage (not shown). In alternate embodiments where the "watermarks" apply to all data links, the determination may be made at block 302 instead.

Upon determining the working capacity of the allocated storage medium (which may be actual or effective, but hereon forward, simply working capacity without qualification unless the context requires), preemptive pause control logic 110 determines the pause durations to be included in the pause controls, and the periodicity for issuing the pause controls, block 308.

In various embodiments where the fill rate of the input line is a very fast rate, such as the case of 10 Gb Ethernet, the pause duration included each pause control for a data link is the same, and the periodicity of issuing the pause controls, i.e. the size of the period is constant. One embodiment for determining the pause duration and the periodicity will be described in more detail below referencing FIG. 3B.

Of course, in alternate embodiments, particularly in embodiments where the fill rate of the input line is not as fast or it is economically practical to employ sufficiently fast components to match the very fast line fill rate, the present invention may be practiced with different pause durations being included in the different pause controls, and/or variable period sizes.

Upon determining the pause duration and the periodicity, preemptive pause control logic 100 proceeds to preemptively regulate the network traffic of the data link by preemptively and successively issuing the pause controls (with the determined pause duration) in accordance with the determined periodicity, block 310.

Back at block 304, if establishment of a new data link is not detected, preemptive pause control logic 110 proceeds/continues to preemptively regulate the established data links, i.e. block 310.

The preemptive regulation terminates coincident with the tear down of a data link.

Referring now to FIG. 3B, wherein a flow chart illustrating the operational flow of the relevant aspects of preemptive pause control logic 110 for determining the pause duration and periodicity for regulating a data link, in accordance with one embodiment, is shown. As alluded to earlier, the embodiment determines a single duration for inclusion in each of the pause controls to be issued to the sender of the network traffic of a data link, and a single periodicity for the preemptive and successive issuance of the pause controls.

As illustrated, preemptive pause control logic 110 first determines a network traffic drain rate of the data link, block 322. In various embodiments, the network traffic drain rate is the maximum drain rate allowable for the data link. In various embodiments, the maximum drain rate for a data link is a configurable parameter (typically by sender protocol type or by the service level agreement between the sender and receiver). For some embodiments, as with the fill rate of the input line, preemptive pause control logic 110 determines the network traffic drain rate of a link by retrieving the rate from configurable storage (not shown). In other embodiments, the drain rate is controlled by a network management application, e.g., by a quality-of-service routine of an application that controls network processor 100).

For the embodiment, upon determining the network traffic drain rate of the data link, preemptive pause control logic 110 determines the difference between the earlier described fill rate of the input line and the determined network traffic drain rate of the data link, block 324.

Next, for the embodiment, preemptive pause control logic 110 determines the periodicity based on the ratio between the working capacity of the allocated storage medium and the determined difference in the fill rate of the input line and the drain rate of the data link, block 326.

Then, preemptive pause control logic 110 determines the pause duration by first determining the ratio between the working capacity of the allocated storage medium and the determined drain rate of the data link (referring to as the initial or nominal pause duration), block 328, and then applying an estimated latency to the initial/nominal pause duration, block 330.

The estimated latency is applied to account for potential latency or delay between the time the sender receives the pause control and the time the sender begins pausing the traffic it is sending. The exact amount is application dependent, e.g. dependent on the hardware and/or software interrupt latency in the sender.

Similarly, an estimated latency may also be applied to periodicity that is based on the dynamically determined network traffic drain rate of the data link, or upon determining a significant change in the network traffic drain rate of the data link.

Accordingly, network traffic of data links are advantageously regulated in a straight forward and effective manner, overcoming the disadvantage of the prior art responsive approach.

In alternate embodiments, the network traffic drain rate of the data link may be dynamically determined, i.e. the actual drain rate of the data link instead. For these embodiments, preemptive pause control logic 110 may systematically recompute the pause duration and/or periodicity based on the dynamically determined network traffic drain rate of the data link, or upon determining a significant change in the network traffic drain rate of the data link. Similarly, "significance" may be application dependent and preferably be configurable using any one of a number of known configuration techniques.

In various embodiments, the pause control operation is performed in conformance with the Institute of Electrical and Electronics Engineers, Inc., (IEEE) standard Draft 802.3ae/D3.0, Annex 31B. Accordingly, the various time parameter values are specified in units of pause quanta (PQ), where one PQ is equal to 512 bit times. The amount of PQ may be any integer value between 0-65535. In other words, the largest amount of PQ assignable is 65535×512=33553920 bit times (or 3.355 ms for 10 Gigabit Ethernet).

Further, in various embodiments that control 10 Gigabit Ethernet links, the pause control provided to the sender/senders by preemptive pause control logic 110 is in the form of an Ethernet "PAUSE frame", which contains the value of the pause duration in its PAUSE frame's "pause_time" field), where the pause duration is specified in units of PQ.

FIG. 4 illustrates an exemplary application of network processor of FIG. 1 incorporated with teachings of the present invention. Illustrated in FIG. 4 is integrated optical networking module 400 incorporated with network processor 100 of FIG. 1, which as described earlier is incorporated with the preemptive network traffic control teachings of the present invention for data links. Optical networking module 400 includes optical components 402, optical-electrical components 404, support control electronics 405, and network processor 100 of FIG. 1, coupled to each other as shown. As alluded earlier, network processor 100 may be a multi-protocol processor having in particular, a number of interfaces and processing units, collectively referenced as reference number 410, control function unit 408, processor interface 407 and utility interface 409 coupled to each other and components 402-404 as shown.

Optical components 402 are employed to facilitate the sending and receiving of optical signals encoded with data transmitted in accordance with a selected one of a plurality of protocols known in the art. Optical-electrical components 404 are employed to encode the egress data onto the optical signals, and decode the encoded ingress data. In a presently preferred embodiment, the supported datacom and telecom protocols include but are not limited to SONET/SDH, 10GBASE-LR, 10GBASE-LW, Ethernet-Over-SONET, Packet Over SONET, and so forth. Support control electronics 405 are employed to facilitate management of the various aspects of optical components 402 and optical-electrical components 404. Network processor 100 may be employed to perform data link and physical sub-layer processing on the egress and ingress data in accordance with a selected one of a plurality of supported datacom/telecom protocols, and to facilitate management of the network processor 100 itself and optical, optical-electrical components 402 and 404 (through support control electronics 405).

In a presently preferred embodiment, optical components 402, optical-electrical components 404, support control electronics 405 and network processor ASIC 100 are encased in a body (not shown) forming a singular optical networking module, with provided software forming a singular control interface for all functionality. That is, in addition to being equipped to provide optical to electrical and electrical to optical conversions, clock and data recovery, and so forth, integrated optical networking module 400 is also equipped to provide data link and physical sub-layer processing on egress and ingress data selectively for a number of protocols.

Further, in the preferred embodiment, control function unit 408 also includes control features, i.e. control registers and the like (not shown), in conjunction with support control electronics 405 to support a number of control functions for managing optical components 402, optical-electrical components 404 as well as network processor ASIC 100. Processor interface 407 is employed to facilitate provision of control specifications to control function unit 408, whereas utility interface 409 (a digital interface) is employed to facilitate management of components 402 and 404 by control function unit 408 (by way of support control electronics 405). The complementary control functions are placed with an embedded processor of optical networking equipment employing integrated optical network module 400. That is, integrated optical networking module 400 advantageously presents a singular unified software interface to optical networking equipment designers and developers to manage configuration and operation of the optical and electrical components, as well as protocol processing. As those skilled in the art would appreciate, as a result, the complexity of designing optical networking equipment, such as optical-electrical routers, switches, and the like, is reduced.

Optical networking module 400 is the subject matter of co-pending application Ser. No. 09/861,002, entitled "An Optical Networking Module Including Protocol Processing And Unified Software Control", having at least partial common inventorship and filed May 18, 2001. The co-pending application is hereby fully incorporated by reference.

While the present invention has been described in terms of the foregoing embodiments and applications, those skilled in the art will recognize that the invention is not limited to these embodiments nor applications. The present invention may be practiced with modification and alteration within the spirit and scope of the appended claims. Thus, the description is to be regarded as illustrative instead of restrictive on the present invention.

What is claimed is:

1. In a networking apparatus, a method of operation comprising:

allocating at least one storage medium to service network traffic of a link;

receiving, buffering, and forwarding network traffic of the link using said allocated storage medium;

determining one or more sizes of at least one period in a plurality of periods between successive preemptive issuance of the preemptive pause controls for a sender of the link;

preemptively issuing pause controls over said plurality of periods to the sender of the network traffic of the link to preemptively regulate a rate the sender transmits network traffic for the link; and wherein said determining of said one or more sizes of said periods comprises determining the one or more sizes of said periods, based at least in part on a ratio of a working capacity of the allocated storage medium to a difference between a fill rate of an input line over which the network traffic is received and a network traffic drain rate of the link.

2. The method of operation of claim 1, wherein each of said preemptive issuance of pause controls to the sender of the network traffic of the link comprises preemptively issuing a pause control to the sender including a duration the sender is to pause and refrain from transmitting network traffic for the link.

3. The method of operation of claim 2, wherein the method further comprises determining said duration the sender is to pause and refrain from transmitting networking traffic for the link.

4. The method of operation of claim 3, wherein said determining of said pause duration comprises determining the pause duration, based at least in part on a working capacity of the allocated storage medium.

5. The method of operation of claim 4, wherein said working capacity of the allocated storage medium comprises a selected one of an actual working capacity and an effective working capacity of the allocated storage medium.

6. The method of operation of claim 5, wherein said effective working capacity of the allocated storage medium comprises a portion of said actual working capacity of the allocated storage medium between a configurable low watermark and a configurable high watermark of the allocated storage medium.

7. The method of operation of claim 3, wherein said determining of said pause duration comprises determining the pause duration, based at least in part on a network traffic drain rate of the link.

8. The method of operation of claim 3, wherein said determining of said pause duration comprises determining the pause duration, based at least in part on a ratio of a working capacity of the allocated storage medium to a network traffic drain rate of the link.

9. The method of operation of claim 3, wherein said determining of said pause duration comprises determining the pause duration, based at least in part on a ratio of a working capacity of the allocated storage medium to a network traffic drain rate of the link, and a latency of the sender in processing a pause control.

10. In a networking apparatus, a method of operation comprising:

allocating at least one storage medium to service network traffic of a link;

receiving, buffering, and forwarding network traffic of the link using said allocated storage medium;

determining one or more sizes of at least one period in a plurality of periods between successive preemptive issuance of the preemptive pause controls for a sender of the link;

preemptively issuing pause controls over said plurality of periods to the sender of the network traffic of the link to preemptively regulate a rate the sender transmits network traffic for the link; and wherein said determining of said one or more sizes of said periods comprises determining the one or more sizes of said periods, based at least in part on a ratio of a working capacity of the allocated storage medium to a difference between a fill rate of an input line over which the network traffic is received, a network traffic drain rate of the link, and a latency of the sender in processing a pause control.

11. A network apparatus comprising:

an input/output (I/O) line;

at least one storage medium coupled to the I/O line, to be allocated to service network traffic of a link;

control logic coupled to the I/O line to preemptively issue pause control to a sender of the network traffic of the link to preemptively regulate a rate the sender transmits network traffic for the link, while the network traffic of the link is received, buffered, and forwarded using the allocated storage medium, wherein said control logic is further equipped to determine one or more sizes of at least one period in a plurality of periods between successive preemptive issuance of the preemptive pause controls for the sender of the link, wherein said control logic is equipped to preemptively issue the pause controls for the sender over said plurality of periods; and wherein said control logic is equipped to determine the one or more sizes of said periods, based at least in part on a ratio of a working capacity of the allocated storage medium to a difference between a fill rate of an input line over which the network traffic is received and a network traffic drain rate of the link.

12. The network apparatus of claim 11, wherein said control logic is equipped to include with each the pause controls issued, a duration the sender is to pause and refrain from transmitting network traffic for the link.

13. The networking apparatus of claim 12, wherein said control logic is further equipped to determine said duration the sender is to pause and refrain from transmitting networking traffic for the link.

14. The networking apparatus of claim 13, wherein said control logic is equipped to determine the pause duration, based at least in part on a working capacity of the allocated storage medium.

15. The networking apparatus of claim 14, wherein said working capacity of the allocated storage medium comprises a selected one of an actual working capacity and an effective working capacity of the allocated storage medium.

16. The networking apparatus of claim 15, wherein said effective working capacity of the allocated storage medium comprises a portion of said actual working capacity of the allocated storage medium between a configurable low watermark and a configurable high watermark of the allocated storage medium.

17. The networking apparatus of claim 13, wherein said control logic is equipped to determine the pause duration, based at least in part on a network traffic drain rate of the link.

18. The networking apparatus of claim 13, wherein said control logic is equipped to determine the pause duration, based at least in part on a ratio of a working capacity of the allocated storage medium to a network traffic drain rate of the link.

19. The networking apparatus of claim 13, wherein said control logic is equipped to determine the pause duration, based at least in part on a ratio of a working capacity of the allocated storage medium to a network traffic drain rate of the link, and a latency of the sender in processing a pause control.

20. The networking apparatus of claim 11, wherein said storage medium are disposed in a distributed manner on a plurality of interfaces and at least one function block of the networking apparatus.

21. A networking apparatus comprising:

an input/output (I/O) line;

at least one storage medium coupled to the I/O line, to be allocated to service network traffic of a link;

control logic coupled to the I/O line to preemptively issue pause controls to a sender of the network traffic of the link to preemptively regulate a rate the sender transmits network traffic of the link, while the network traffic of the link is received, buffered, and forwarded using the allocated storage medium, wherein said control logic is further equipped to determine one or more sizes of at the last one period in a plurality of periods between successive preemptive issuance of the preemptive pause controls for the sender of the link, wherein said control logic is equipped to preemptively issue the pause controls for the sender over said plurality of periods; and wherein said control logic is equipped to determine the one or more sizes of said periods, based at least in part on a ratio of a working capacity of the allocated storage medium to a difference between a fill rate of an input line over which the network traffic is received, a network traffic drain rate of the link, and a latency of the sender in processing a pause control.

22. The networking apparatus of claim 21, wherein said networking apparatus comprises a multi-protocol network processor, and at least a portion of said storage medium and said control logic are disposed within the multi-protocol network processor.

23. The networking apparatus of claim 21, wherein said networking apparatus comprises an optical networking module, and at least a portion of said storage medium and said control logic are disposed within the optical networking module.

24. A networking apparatus comprising:

an input/output (I/O) line;

storage medium coupled to the I/O line, to be allocated to service network traffic of a link; and means for preemptively issuing pause controls to a sender of the network traffic of the link to preemptively regulate a rate the sender transmits network traffic for the link, while the network traffic of the link is received, buffered, and forwarded using the allocated storage medium, wherein said issuing means is further equipped to determine one or more sizes of at least one period in a plurality of periods between successive preemptive issuance of the preemptive pause controls for the sender of the link, and wherein said issuing means is equipped to preemptively issue the pause controls for the sender over said plurality of periods, wherein said issue means is equipped to determine the one or more sizes of said periods, based at the last in part on a ratio of a working capacity of the allocated storage medium to a difference between a fill rate of an input line over which the network traffic is received and a network traffic drain rate of the link.

* * * * *

UNITED STATES PATENT AND TRADEMARK OFFICE
CERTIFICATE OF CORRECTION

PATENT NO. : 7,433,303 B2  Page 1 of 1
APPLICATION NO. : 10/211174
DATED : October 7, 2008
INVENTOR(S) : She et al.

It is certified that error appears in the above-identified patent and that said Letters Patent is hereby corrected as shown below:

In the Claims:

Col. 10, line 16, "pause control to a" should read --pause controls to a--

Col. 11, line 13, "network traffic of the" should read --network traffic for the--

Col. 11, line 16-17, "sizes of at the last one" should read --sizes of at least one--

Signed and Sealed this

Twenty-sixth Day of October, 2010

David J. Kappos
*Director of the United States Patent and Trademark Office*